US010977549B2

United States Patent
Kim et al.

(10) Patent No.: US 10,977,549 B2
(45) Date of Patent: Apr. 13, 2021

(54) OBJECT ANIMATION USING GENERATIVE NEURAL NETWORKS

(71) Applicant: Adobe Inc., San Jose, CA (US)

(72) Inventors: Vladimir Kim, Seattle, WA (US); Omid Poursaeed, New York, NY (US); Jun Saito, Seattle, WA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 71 days.

(21) Appl. No.: 16/276,559

(22) Filed: Feb. 14, 2019

(65) Prior Publication Data

US 2020/0265294 A1 Aug. 20, 2020

(51) Int. Cl.
*G06T 13/00* (2011.01)
*G06N 3/04* (2006.01)
*G06N 3/08* (2006.01)
*G06T 17/20* (2006.01)

(52) U.S. Cl.
CPC ............ *G06N 3/0454* (2013.01); *G06N 3/08* (2013.01); *G06T 13/00* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 9,478,033 | B1* | 10/2016 | Safreed | H04N 19/54 |
| 10,679,046 | B1* | 6/2020 | Black | G06T 17/00 |
| 2011/0074778 | A1* | 3/2011 | Turner | H04N 13/261 |
| | | | | 345/420 |
| 2011/0141319 | A1* | 6/2011 | Watazawa | H04N 5/23229 |
| | | | | 348/240.2 |
| 2011/0254841 | A1* | 10/2011 | Lim | G06T 17/20 |
| | | | | 345/421 |
| 2013/0187919 | A1* | 7/2013 | Medioni | G06K 9/00342 |
| | | | | 345/420 |
| 2013/0335426 | A1* | 12/2013 | Noris | G06T 13/00 |
| | | | | 345/473 |
| 2013/0342527 | A1* | 12/2013 | Molyneaux | G06T 17/20 |
| | | | | 345/419 |

(Continued)

OTHER PUBLICATIONS

Kato, Hiroharu, Yoshitaka Ushiku, and Tatsuya Harada. "Neural 3D Mesh Renderer." arXiv preprint arXiv:1711.07566 (2017).*

(Continued)

*Primary Examiner* — Sultana M Zalalee
(74) *Attorney, Agent, or Firm* — FIG. 1 Patents

(57) ABSTRACT

In implementations of object animation using generative neural networks, one or more computing devices of a system implement an animation system for reproducing animation of an object in a digital video. A mesh of the object is obtained from a first frame of the digital video and a second frame of the digital video having the object is selected. Features of the object from the second frame are mapped to vertices of the mesh, and the mesh is warped based on the mapping. The warped mesh is rendered as an image by a neural renderer and compared to the object from the second frame to train a neural network. The rendered image is then refined by a generator of a generative adversarial network which includes a discriminator. The discriminator trains the generator to reproduce the object from the second frame as the refined image.

20 Claims, 10 Drawing Sheets

(56) References Cited

U.S. PATENT DOCUMENTS

| | | | |
|---|---|---|---|
| 2014/0379308 A1* | 12/2014 | Georgescu | G06F 30/00 |
| | | | 703/1 |
| 2015/0029198 A1* | 1/2015 | Sumner | G06T 13/20 |
| | | | 345/474 |
| 2017/0206694 A1* | 7/2017 | Jiao | G06T 13/40 |
| 2019/0026942 A1* | 1/2019 | Zhang | G06T 17/205 |
| 2019/0236809 A1* | 8/2019 | Graziosi | G06T 7/10 |
| 2019/0304181 A1* | 10/2019 | Farahbakhshian | G06K 9/44 |

OTHER PUBLICATIONS

Wang, Nanyang, et al. "Pixel2mesh: Generating 3d mesh models from single rgb images." Proceedings of the European Conference on Computer Vision (ECCV). 2018.*

* cited by examiner

OBJECT ANIMATION USING GENERATIVE NEURAL NETWORKS

BACKGROUND

Digital animation systems are implemented by a computing device to support the process of making an object appear to move in a two-dimensional or three-dimensional environment. To do so, digital animation systems define how the object will move, appear, and interact with the object's environment. For example, animating an object to appear to walk on two legs requires definitions for the object's gait, speed, posture, etc.

Conventional techniques used to animate objects, however, rely on manual user interaction to define how the object will move, appear, and interact with the object's environment. Additionally, these definitions must be made for every object requiring animation. For example, if a first object is already animated to walk on two legs and if it was desirable to animate a second object to walk on two legs like the first object, then a user would be required to repeat all of the definitions used to animate the first object to walk on two legs in order to animate the second object to walk on two legs. The reason for this is because conventional digital animation systems have no mechanism for transferring animation from one object to another object. Additionally, conventional animation systems require manual user interaction to generate object animation, even very basic animation. These shortcomings cause animators significant frustration when undertaking the tedious task of animating an object to have features of another animated object. The shortcomings also add to the computational cost of digital animation by requiring computations to render animation definitions for every object requiring animation.

SUMMARY

Systems and techniques are described for object animation using generative neural networks. A computing device implements an animation system which receives a digital video having an animated object as an input. The animation system includes a meshing module, a warping module, and a training module. The meshing module obtains a mesh of the animated object from a first frame of the digital video. This mesh has a plurality of vertices which correspond to features of the object in the first frame. The animation system selects a second frame from the digital video which also has the animated object but in a different orientation than in the first frame. For example, the object might be standing with its arms at its sides in the first frame and the object may have its right arm raised with its right elbow bent in the second frame.

The animation system identifies features of the object in the second frame using an encoder of a neural network and maps the identified features to the vertices of the mesh using a decoder of the neural network. The mapping generates a vertex offset for the mesh which predicts how the mesh is to be deformed to reproduce the animated object as it appears in the second frame. The computing device implements the warping module to warp the mesh based on the vertex offset and then a Neural Renderer renders the warped mesh as an image. The training module compares the rendered image to the second frame and trains the neural network with a loss function based on the comparison.

A generator module of a generative adversarial network system then receives the rendered image as an input and generates a refined image of the animated object in the second frame. A discriminator module of the generative adversarial network system receives the refined image as well as the second frame. The generator module is configured to generate candidates which are then evaluated by the discriminator module, e.g., to determine whether the candidates are real or fake. A goal of the generator module is therefore to generate a candidate that is considered real by the discriminator module, e.g., through comparison to a ground truth. Accordingly, the generator module is trained as part of adversarial back-and-forth communication between the generative and discriminator modules in order to generate "real" candidates.

In the techniques described herein, the generative adversarial network system is employed to train the generator module to refine rendered images in a manner that is considered "real" by a discriminator module of the generative adversarial network system. To do so, the generator module of the generative adversarial network system receives the rendered image as an input, and from this, generates a refined image of the animated object in the second frame. The refined image is then communicated to a discriminator module to determine whether this refined image is real or fake. The generator module is trained by backpropagation of a result of the comparison, e.g., whether the refined image is considered real or fake. In this way, the generator module is trained to refine images automatically and without user intervention.

The described systems and techniques improve digital animation by allowing digital animators to transfer an animation of an object to another object which also significantly increases the efficiency of digital animation. These systems and techniques also improve a user experience for digital animators by eliminating the tedious task of animating an object to have features of another animated object. Additionally, the systems and techniques can improve computational efficiency by using neural networks to transfer animation from an object to another object instead of requiring computations to render animation definitions for every object requiring animation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
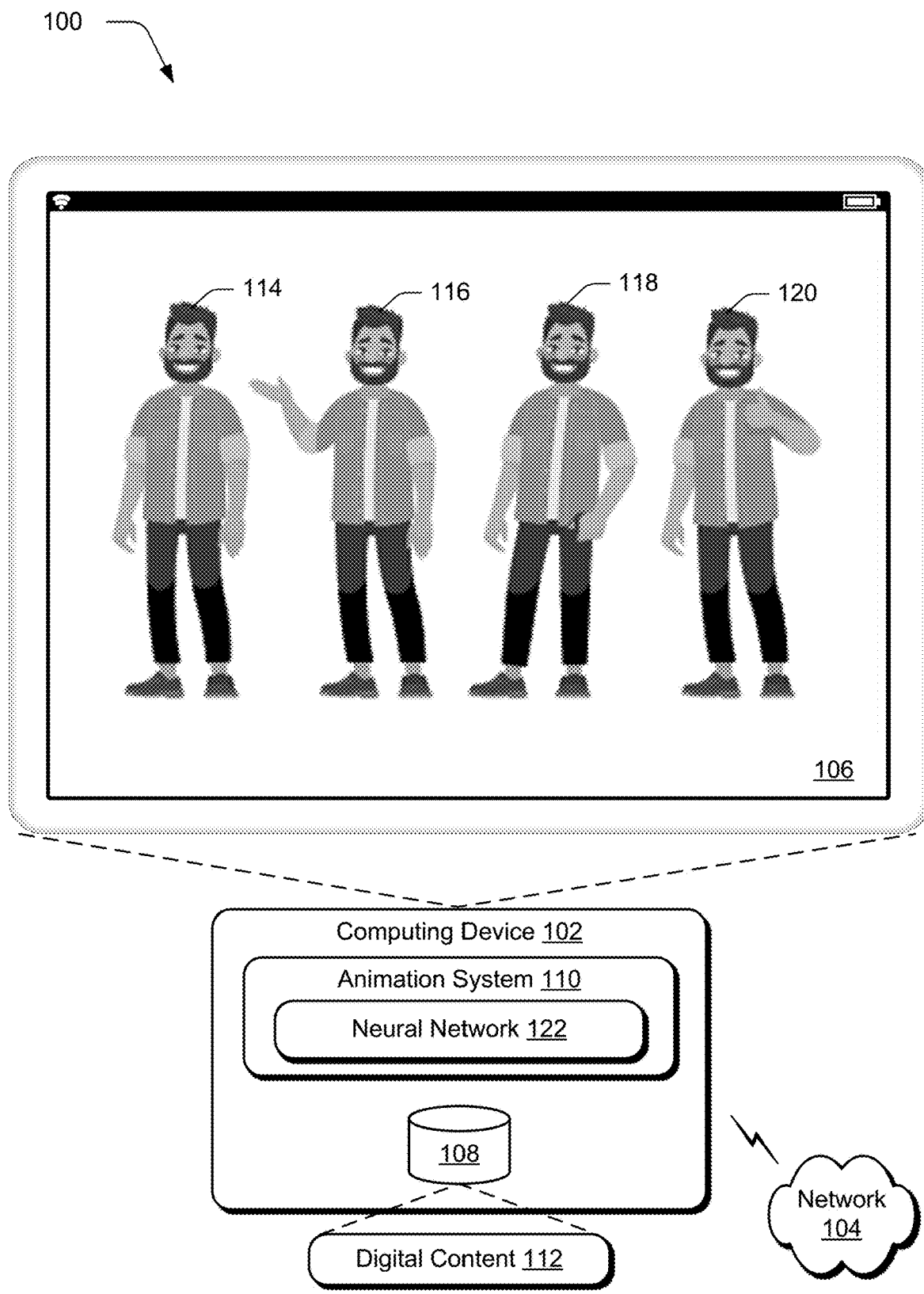
FIG. 1 is an illustration of an environment in an example implementation that is operable to employ digital systems and techniques as described herein.

Digital animation systems are implemented by a computing device to support the process of making an object appear to move in a two-dimensional or three-dimensional digital environment. To do so, digital animation systems define how the object will move, appear, and interact with the object's environment. For example, animating an object to appear to walk on two legs requires definitions for the object's gait, speed, posture, etc. Conventional techniques used to animate objects, however, rely on manual user interaction to define how the object will move, appear, and interact with the object's environment, and these definitions must be made for every object requiring animation.

In one conventional example, if a first object is already animated to walk on two legs and if it was desirable to animate a second object to walk on two legs like the first object, then a user would be required to repeat all of the definitions used to animate the first object to walk on two legs in order to animate the second object to walk on two legs. This is because conventional digital animation systems have no mechanism for transferring animation from one object to another object. Conventional animation systems require manual user interaction to generate object animation, even very basic animation. These shortcomings cause animators significant frustration when undertaking the tedious task of animating an object to have animation features of another animated object. The shortcomings of conventional systems also add to the computational cost of digital animation by requiring computations for animation definitions for every object requiring a particular animation feature. Consider an example in which a digital animator needs to animate three different objects to appear to walk on two legs. In this example, not only would the animator be required to separately define the walking animation feature for each of the three objects, but these three sets of definitions would each be processed to render the three animated objects.

Accordingly, in the techniques describe herein a computing device implements an animation system which receives a digital video having an animated object. The animation system includes a neural network which is generally a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. According to various implementations, such a machine-learning model uses supervised learning, semi-supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data.

The neural network includes a meshing module, a selection module, and an identification module. The meshing module generates a mesh of portions of the animated object from a first frame of the digital video. The meshed portions of the animated object are combined by a layering module of the animation system which includes a layering dimension to determine a relative depth of the portions of the animated object. This combined mesh has a plurality of vertices which correspond to features of the animated object in the first frame.

The selection module selects a second frame from the digital video which also has the animated object but in a different orientation than in the first frame. In the first frame, the object might be standing with its arms at its sides, but the object may have its right arm raised with its right elbow bent in the second frame. The identification module identifies features of the animated object in the second frame using an encoder of a neural network.

The animation system also includes a mapping module and a prediction module. The mapping module maps the identified features of the object in the second frame to the vertices of the combined mesh. Next, the prediction module generates a vertex offset for the mesh using a decoder of the neural network. This vertex offset is a prediction of how the combined mesh is to be deformed to reproduce the animated object as it appears in the second frame.

The computing device implements a warping module to warp the mesh based on the vertex offset and then a rendering module renders the warped mesh as an image. A training module of the animation system compares the rendered image to the second frame of the video and trains the neural network using a loss function based on the comparison. In this manner, the neural network learns how to reproduce the animated object in the second frame of the digital video. The reproduction of the animated object is then further improved with a generative adversarial network system.

A generator module of a generative adversarial network system then receives the rendered image as an input and generates a refined image of the animated object in the second frame. A discriminator module of the generative adversarial network system receives the refined image as well as the second frame. The generator module is configured to generate candidates which are then evaluated by the discriminator module, e.g., to determine whether the candidates are real or fake. A goal of the generator module is therefore to generate a candidate that is considered real by the discriminator module, e.g., through comparison to a ground truth. Accordingly, the generator module is trained as part of adversarial back-and-forth communication between the generative and discriminator modules in order to generate "real" candidates as part of the training.

In the techniques described herein, the generative adversarial network system is employed to train the generator module to refine rendered images in a manner that is considered "real" by a discriminator module of the generative adversarial network system. To do so, the generator module of the generative adversarial network system receives the rendered image as an input, and from this, generates a refined image of the animated object in the second frame. The refined image is then communicated to a discriminator module to determine whether this refined image is real or fake. The generator module is trained by backpropagation of a result of the comparison, e.g., whether the refined image is considered real or fake. In this way, the generator module is trained to refine images automatically and without user intervention. By reproducing the object's movements from multiple frames from the digital video, the object's animation can be reproduced without having information about the animation in the digital video.

The described systems and techniques improve digital animation by allowing digital animators to transfer an animation of an object to another object. This improvement also significantly increases the efficiency of digital animation. These systems and techniques improve a user experience for digital animators by eliminating the tedious task of animating an object to have features of another animated object. Additionally, the systems and techniques can improve computational efficiency by using neural networks to transfer animation from an object to another object instead of requiring computations to render animation definitions for every object requiring animation.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and an animation system 110. The storage device 108 is illustrated to include digital content 112. An example of the digital content 112 is a digital video such as a digital video having an animated object interacting with an environment. The digital video is illustrated as frames 114-120 shown on the display device 106. The frames 114-120 are snapshots of the object as it moves in the digital video. Thus, the digital video may be observed as a series of frames 114-120 on a display of the display device 106. For example, in frame 114, the object is standing with its arms at its side, but in frame 116, the object's right arm is raised as if to direct the viewer's attention to something of interest. The object appears relaxed with its left hand partially in its pants pocket in frame 118, and the object appears to be giving a thumb's up with its left hand in frame 120. Thus, when frames 114-120 are displayed in succession, the object's various poses in each of the frames 114-120 may appear as the animation of the object in the digital video.

The animation system 110 is implemented to reproduce animation from a digital video, such as the digital video having corresponding frames 114-120. The animation system 110 includes a neural network 122 which is generally a machine-learning model. As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data.

According to various implementations, such a machine-learning model uses supervised learning, semi-supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data. In this manner, the animation system 110 receives a digital video having an animated object as an input, and the animation system 110 employs the neural network 122 to output a reproduction of the animated object. In one or more implementations, the animation system 110 may output the reproduction of the animated object without having any information about the animated object in the digital video.

Figure 2:
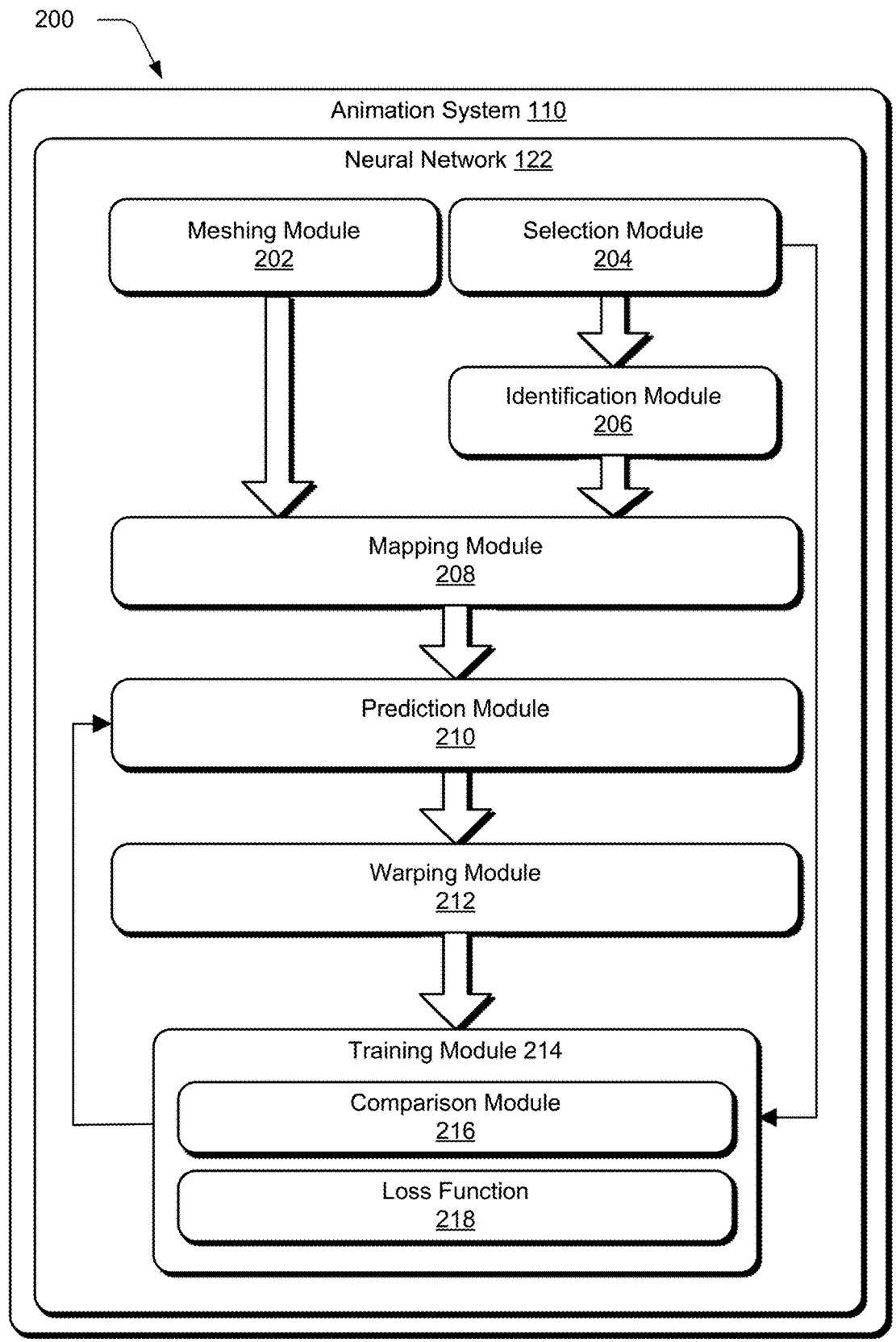
FIG. 2 depicts a system in an example implementation showing operation of an animation system.

FIG. 2 depicts a system 200 in an example implementation showing operation of an animation system 110. As described above, the animation system 110 receives as an input a digital video having frames of an animated object, and the animation system 110 employs the neural network 122 to output a reproduction of the animated object. In more general terms, the animated object in the digital video is an object. In one or more implementations, the neural network 122 can include an encoder to analyze an image of an object and a decoder to predict vertex offsets for vertices of a mesh of the object.

The animation system 110 is illustrated to include a meshing module 202. When implemented, the meshing module 202 obtains a mesh from a first frame 114 of the digital video of the object. This mesh includes a plurality of vertices that correspond to features of the object. The vertices can be offset to change features of the object which may be used to reproduce the object.

The animation system 110 is also illustrated to include a selection module 204. The selection module 204 is implemented to select a second frame 116 from the digital video having the object. An identification module 206 identifies features of the object from the second frame 116 as part of the neural network 122. The neural network 122 includes a mapping module 208 and a prediction module 210. When implemented, the mapping module 208 maps the identified features of the object in the second frame 116 to the vertices of the mesh, and the prediction module 210 generates vertex offsets based on this mapping. Finally, a warping module 212 of the animation system 110 warps the mesh based on the vertex offsets to reproduce the object as it appears in the second frame 116.

The animation system 110 includes a training module 214. The training module 214 includes a comparison module 216 and a loss function 218. The comparison module 216 compares the warped mesh to the object from the second frame 116, and the loss function 218 is used to train the neural network 122. In one example, the loss function 218 may describe reconstruction loss. In this manner, the neural network "learns" how to reproduce the animated object using, solely in this example, the mesh from the first frame 114 of the digital video and offsets to the vertices of the mesh. Further discussion of these and other examples is included in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Object Animation

The following discussion describes object animation techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1 and 2.

Figure 3:
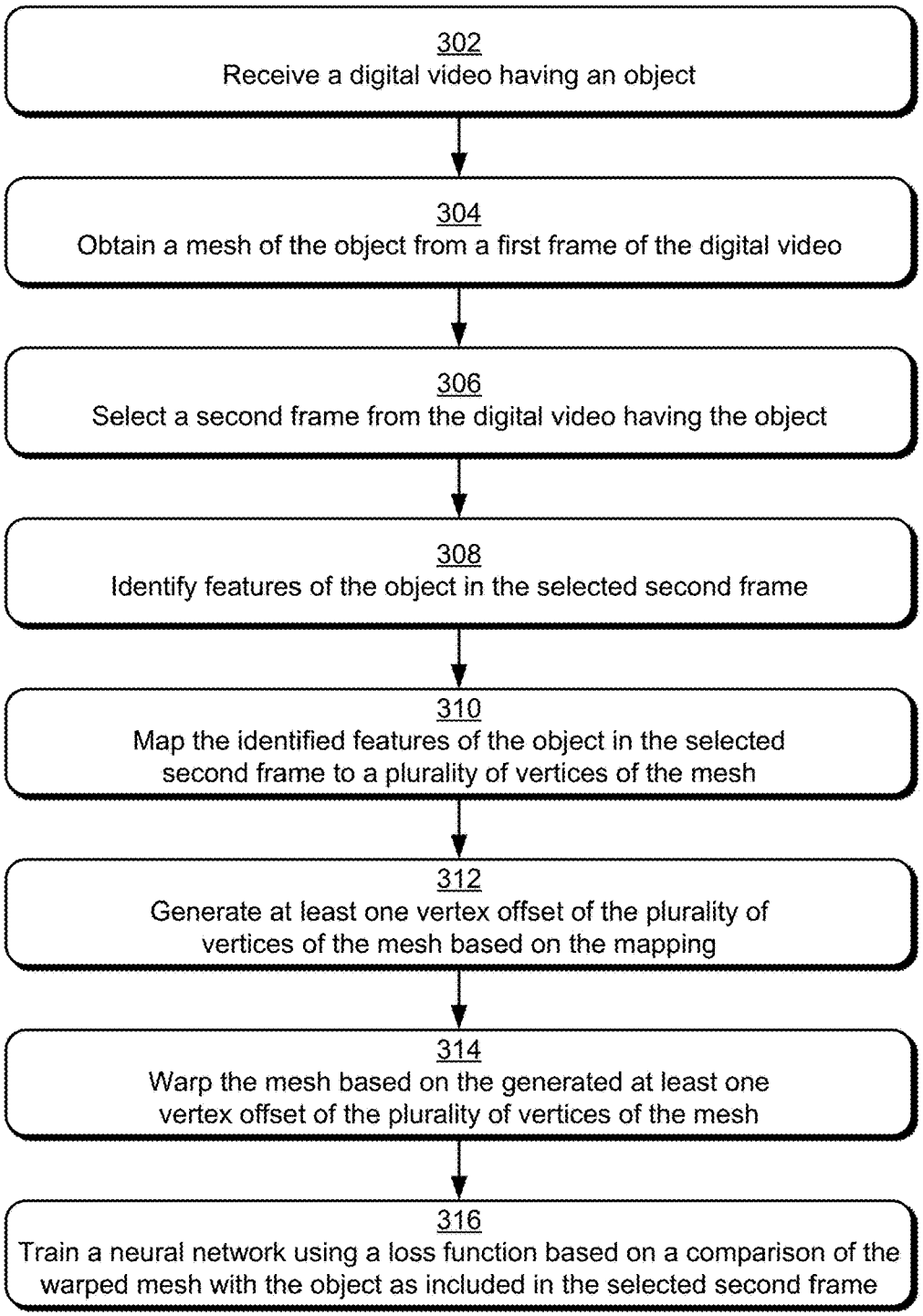
FIG. 3 is a flow diagram depicting a procedure in an example implementation in which a neural network is trained based on a comparison of a warped mesh and an object from a frame of a digital video.

FIG. 3 is a flow diagram depicting a procedure 300 in an example implementation in which a neural network is trained based on a comparison of a warped mesh and an object from a frame of a digital video. The animation system 110 receives a digital video having an object as an input (block 302). For example, the object may be the animated object shown in frames 114-120. The meshing module 202 obtains a mesh of the object from a first frame 114 of the digital video (block 304). This mesh includes a plurality of vertices which correspond to features of the object from the first frame 114, and these vertices can be offset to manipulate the object.

The selection module 204 selects a second frame 116 from the digital video that includes the object (block 306) which is the same object in the first frame 114 but in another configuration. For example, in the first frame 114, the object could be the animated object standing with its arms at its sides, and in the second frame 116, the object could be the animated object with its right arm raised and bent at the elbow. The identification module 206 identifies features of the object from the second frame (block 308), and the mapping module 208 maps the identified features of the object to vertices of the mesh (block 310). In this manner, the animation system 110 determines how to manipulate the vertices of the mesh from the first frame 114 to reproduce the object as it appears in the second frame 116. The prediction module 210 then generates a vertex offset of the vertices of the mesh based on the mapping (block 312).

The warping module 212 warps the mesh based on the vertex offset (block 314) and the training module 214 trains the neural network based on a comparison of the warped mesh with the object from the second frame (block 316). For example, the training module 214 may use the loss function 218 to train the neural network to improve the quality of the reproduction of the object in the second frame 116.

In one example, the neural network 122 may include an encoder for analyzing the object in the second frame 116, a decoder for predicting the vertex offsets to the mesh from the first frame 114, and a Neural Renderer as generally described by Kato et al., Neural 3D Mesh Renderer, arXiv: 1711.07566v1 [cs.CV] 20 Nov. 2017, for rendering the mesh with the vertex offsets as an image. The comparison module 216 may be implemented to compare the rendered image to the object in the second frame 116, and a loss function 218 is then used to train the neural network 122. In this manner, the neural network reproduces the animation from the digital video without having or needing any information about the animation from the digital video.

In one or more implementations, regularization may help avoid overfitting as part of training the neural network 122. Regularization is a form of regression which regulates or minimizes coefficients of the lost function 218, and this helps prevent the neural network 122 from fitting noise in training. This also improves generalization in machine learning. For example, Laplacian regularization may be used to calculate distances between a Laplacian coordinate of a vertex before and after warping the mesh based on the predicted vertex offset. In another example, edge-length regularization may be used to penalize differences in edge lengths before and after warping the mesh.

Object Animation Using Generative Neural Networks

Figure 4:
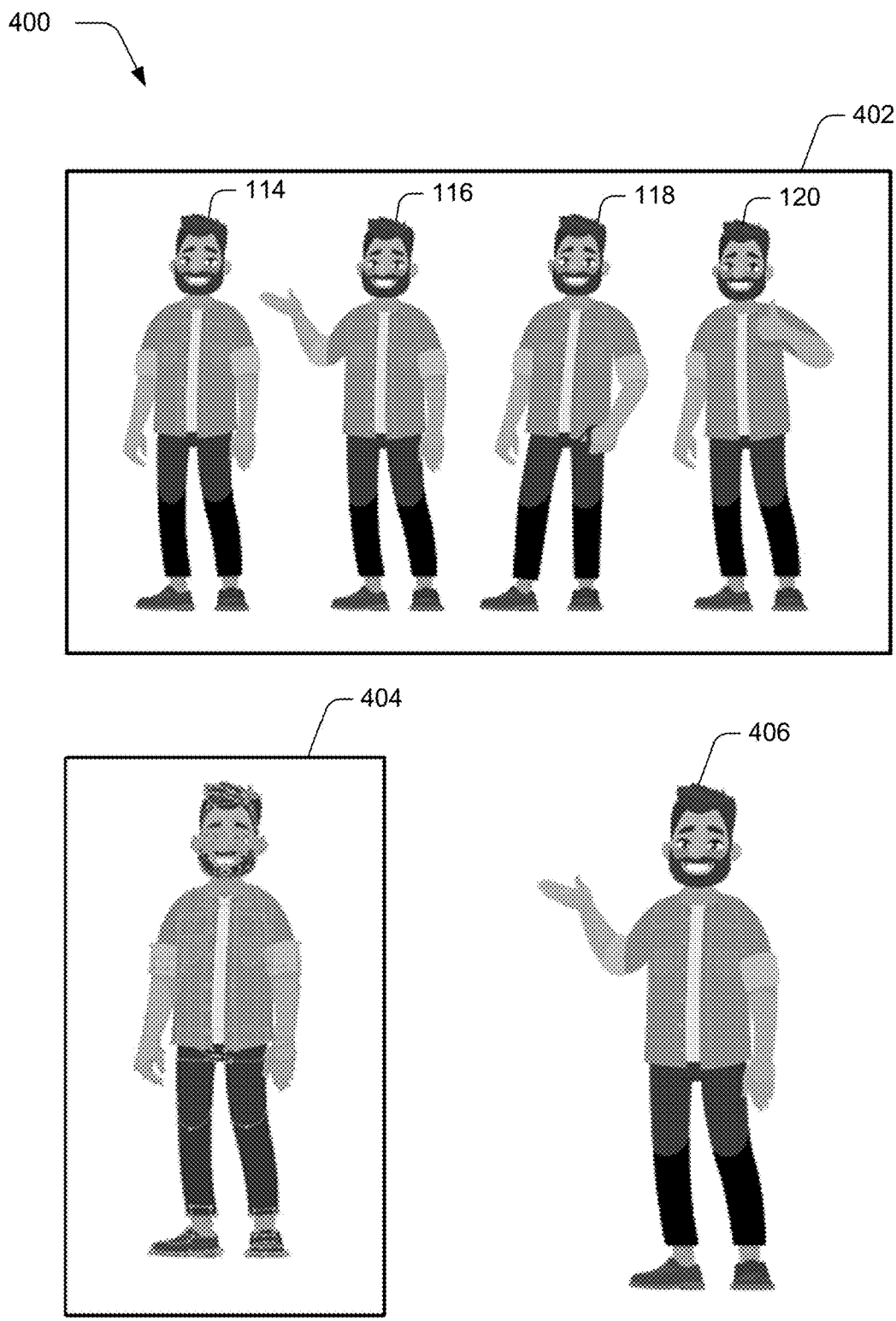
FIG. 4 is an illustration depicting a representation of a mesh from a first frame of a digital video and an object from a second frame of the digital video.

FIG. 4 is an illustration depicting a representation 400 of a mesh from a first frame of a digital video and an object from a second frame of the digital video. As shown in FIG. 4, the representation 400 includes a digital video 402 having frames 114-120 that include an animated object. The representation 400 also includes a mesh 404 of the object as it appears in the first frame 114 and the object 406 as it appears in the second frame 116. The mesh 404 includes a plurality of vertices which correspond to features of the object in the first frame 114, and some features of the object 406 are different than features of the object in the first frame 114. For example, the object in the first frame 114 may be standing with its hands at its sides and the object 406 may have its right arm raised as if to direct the viewer's attention to something of interest.

Thus, a technological problem addressed in the following is how to manipulate the mesh 404 to appear as the object 406. In one or more implementations, a solution to this technological problem includes generating offsets to the vertices of the mesh 404 and training the neural network 122 to predict offsets to the vertices of the mesh 404 such that the predicted offsets to the vertices warp the mesh 404 to appear as the object 406.

In this example, the object 406 has its right arm raised and bent at the elbow, and the neural network 122 predicts offsets to the vertices of the mesh 404 to warp the mesh 404 so that the warped mesh 404 will appear as the object 406 with its right arm raised and bent at the elbow. Thus, the mesh 404 is warped based on the offsets to the vertices, and the warped mesh 404 is generated to have features of the object 406.

Figure 5:
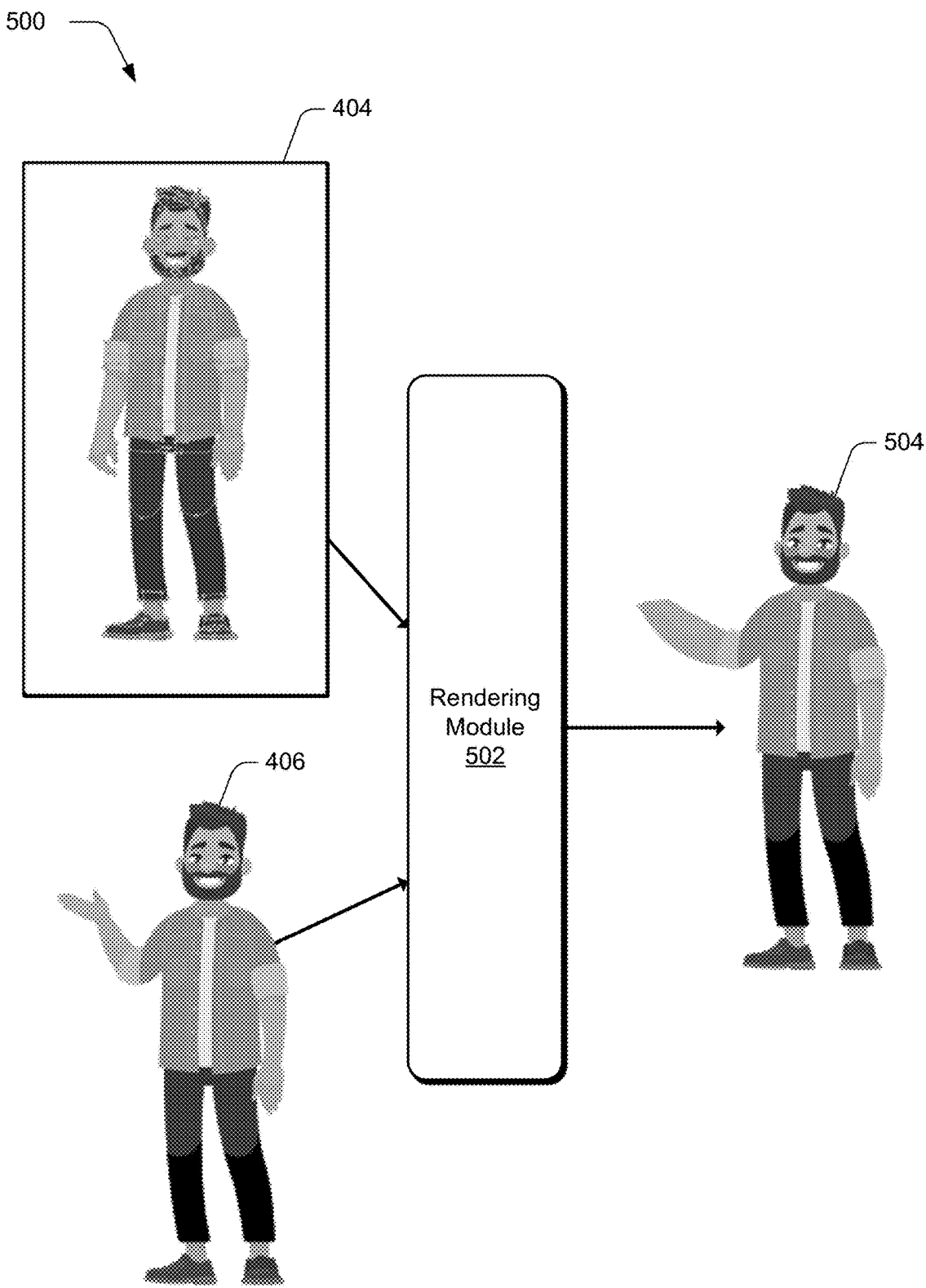
FIG. 5 is an illustration depicting a representation of a rendering of a warped mesh as an image of the object.

FIG. 5 is an illustration depicting a representation 500 of a rendering of a warped mesh as an image of the object. The representation 500 is illustrated to include a rendering module 502 implemented to render an image 504 of a warped mesh. In one example, the rendering module 502 may be a Neural Renderer. The rendering module 502 receives as an input an initial mesh 404 and predicted vertex offsets. The initial mesh 404 may include faces, textures, and initial vertex positions. Thus, the rendering module 502 can receive faces, textures, initial vertex positions, and predicted vertex offsets as inputs. In this way, the rendering module 502 is implemented to warp the initial mesh 404 based on the initial vertex positions and the predicted vertex offsets to appear as the object 406, and then render the warped mesh as an image 504 of the object 406.

In one example, the training module 214 has trained the neural network 122 using the loss function 218 but the image 504 of the object is still distinguishable from the object 406 meaning that the image 504 is not the same as the object 406. For example, as compared to the object 406, the image 504 of the object has too large of an angle at the right elbow, the right forearm is too large, and the right hand is missing. Some other example effects such as stylistic effects or lighting variations may distinguish the image 504 from the object 406. Thus, the technological problem is how to generate an image of a warped mesh that is less distinguishable compared to an object from a frame of a digital video.

Figure 6:
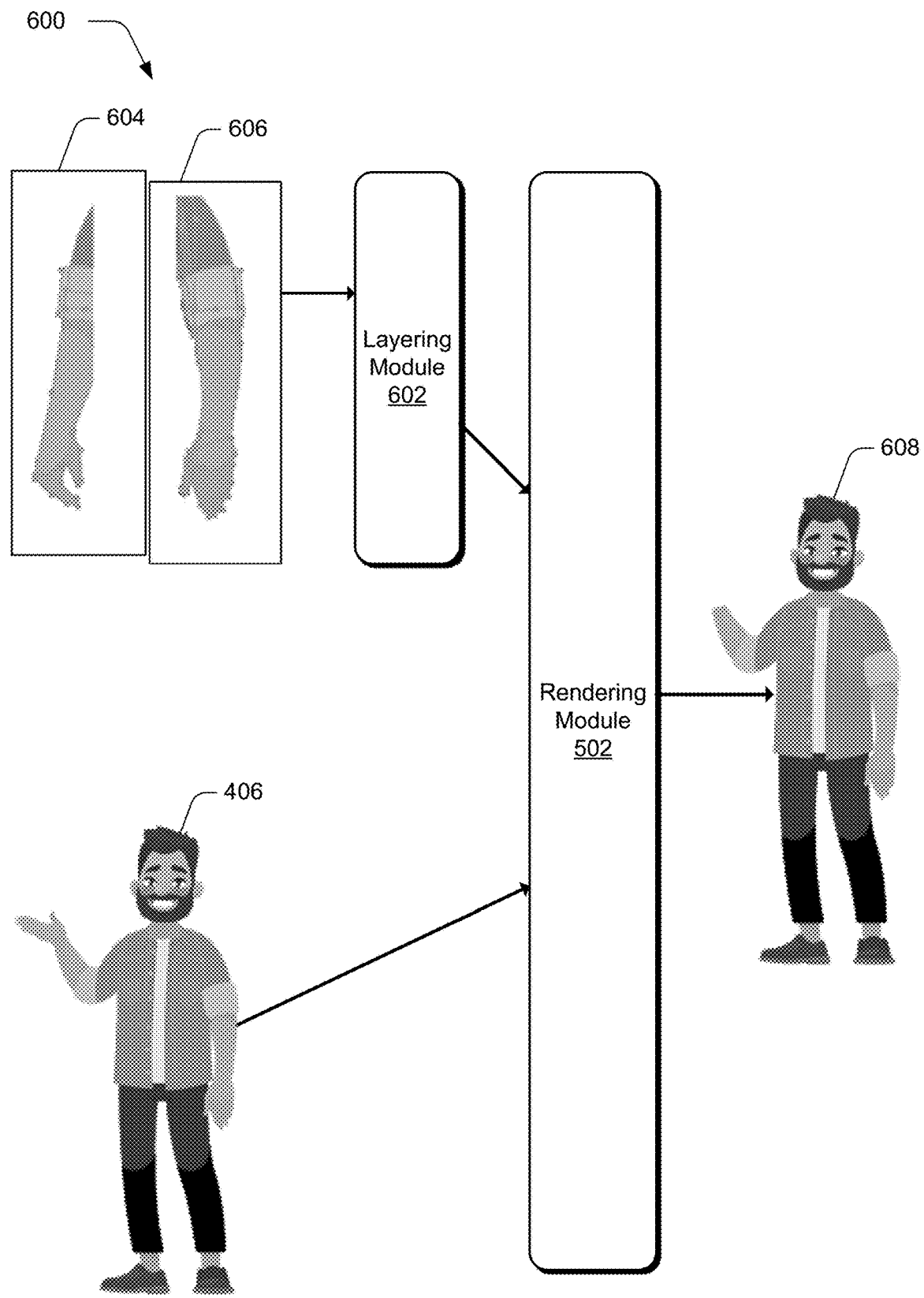
FIG. 6 is an illustration depicting a representation of combining meshes using a layering dimension to distinguish features of the object as inputs to the rendering module.

FIG. 6 is an illustration depicting a representation 600 of combining meshes using a layering dimension to distinguish features of the object as inputs to the rendering module. The representation 600 is illustrated to include a layering module 602 which is implemented to accept a first mesh 604 and a second mesh 606 as inputs and combine the first and second mesh using a layering dimension. The first mesh 604 and the second mesh 606 are sub-meshes and represent a particular feature or features of the object as it appears in the first frame 114. These sub-meshes allow the layering module 602 to combine the first mesh 604 and the second mesh 606 using the layering dimension. The layering dimension allows the neural network 122 an extra dimension to distinguish between features of the mesh 404 of the object as it appears in the first frame 114. For example, the layering dimension may be representative of a relative depth of portions of the object as it appears in the first frame 114, and the neural network 122 can use the layering dimension to distinguish between relative orientations of the portions of the object.

In one or more implementations, the animation system 110 generates the mesh 404 of the object as it appears in the first frame 114 from the first mesh 604 and the second mesh 606 using the layering dimension which is an output of the layering module 602. In one example, the output of the layering module 602 is an input to the rendering module 502. Thus, the rendering module 502 receives as an input an initial mesh 404 and predicted vertex offsets. The initial mesh 404 may include faces, textures, and initial vertex positions. Thus, the rendering module 502 can receive faces, textures, initial vertex positions, and predicted vertex offsets as inputs. In this way, the rendering module 502 is implemented to warp the initial mesh 404 based on the initial vertex positions and the predicted vertex offsets to appear as the object 406, and then render the warped mesh as an image 608 of the object 406.

In one example, the training module 214 has trained the neural network using the loss function 218 but the image 608 of the object is still distinguishable from the object 406. For example, the addition of the layering module 602 has corrected the angle of the right elbow and the size of the right forearm as compared to the image 506 of the object but, as between the image 608 of the object and the object 406, the right hand is still missing in the image 608 of the object.

Figure 7:
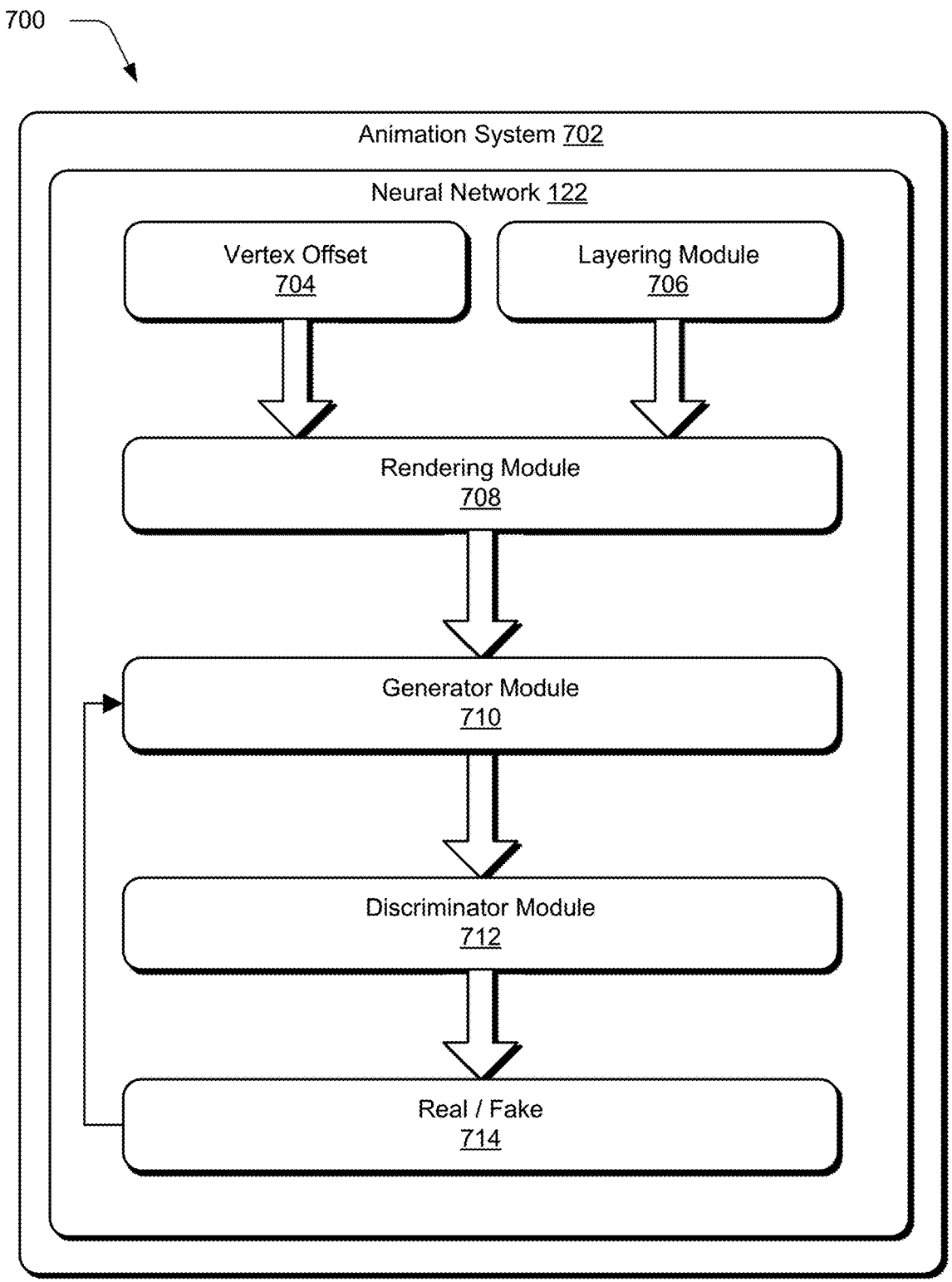
FIG. 7 depicts a system in an example implementation showing operation of an animation system including a generative adversarial network.

FIG. 7 depicts a system 700 in an example implementation showing operation of an animation system including a generative adversarial network. As shown in FIG. 7, the animation system 702 includes a neural network 122 which is illustrated to include a vertex offset 704 and a layering module 706. In one example, the vertex offset 704 may be representative of faces, textures, initial vertex positions, and predicted vertex offsets as inputs. For example, the layering module 706 may be representative of generation of the mesh 404 of the object as it appears in the first frame 114 from the first mesh 604 and the second mesh 606 using the layering dimension.

The animation system 702 also includes a rendering module 708 which can be implemented to warp the mesh 404 based on the predicted vertex offsets and render the warped mesh as an image 608. The vertex offset 704 and the layering module 706 are illustrated as inputs to a rendering module 708. Thus, the rendering module 708 is implemented to receive the vertex offset 704 and the layering module 706 as inputs and the rendering module 708 renders an image 608 as an output. In one example, the rendering module 708 may include a Neural Renderer as generally described by Kato et al., Neural 3D Mesh Renderer, arXiv: 1711.07566v1 [cs.CV] 20 Nov. 2017, to render the mesh as an image based on the vertex offsets predicted by the neural network 122. This rendered image can then be compared to an input image from the digital video to train the neural network 122. For example, the input image may include the object 406. Once trained, the neural network 112 implements the rendering module 708 to render an image 608 that is the same as the object 406 in the second frame 116.

The animation system 702 includes a generative adversarial network which is illustrated as a generator module 710 and a discriminator module 712. Once trained, the generative adversarial network is configured to generate refined images that are indistinguishable from the object 406 in the second frame 116. The generator module 710 receives the rendered image 608 from the rendering module 708 as an input, and the generator module 710 outputs a refined image of the object 406 in the second frame 116. In this way, the generator module 710 is implemented to generate refined image candidates which are then evaluated by the discriminator module 712, e.g., to determine whether the candidates are real or fake 714. A goal of the generator module 710 is therefore to generate a candidate that is considered real by the discriminator module 712, e.g., through comparison to a ground truth. Accordingly, the generator module 710 is trained as part of adversarial back-and-forth communication between the generative and discriminator modules in order to generate "real" candidates.

Thus, the generator module 710 is trained to refine rendered images in a manner that is considered "real" by a discriminator module 712 of the generative adversarial network. As part of this training, the generator module 710 receives the rendered image 608 as an input, and from this, generates a refined image of the animated object 406 in the second frame 116. The refined image is then communicated to the discriminator module 712 to determine whether this refined image is real or fake 714. Thus, the discriminator module 712 receives as inputs the refined image as well as the second frame 116, and the discriminator module 712 is implemented to determine whether the refined image is real or fake 714. The generator module 710 is trained by backpropagation of a result of the comparison, e.g., whether the refined image is considered real or fake 714. In this way, the generator module 710 is trained to refine images automatically and without user intervention.

Figure 8:
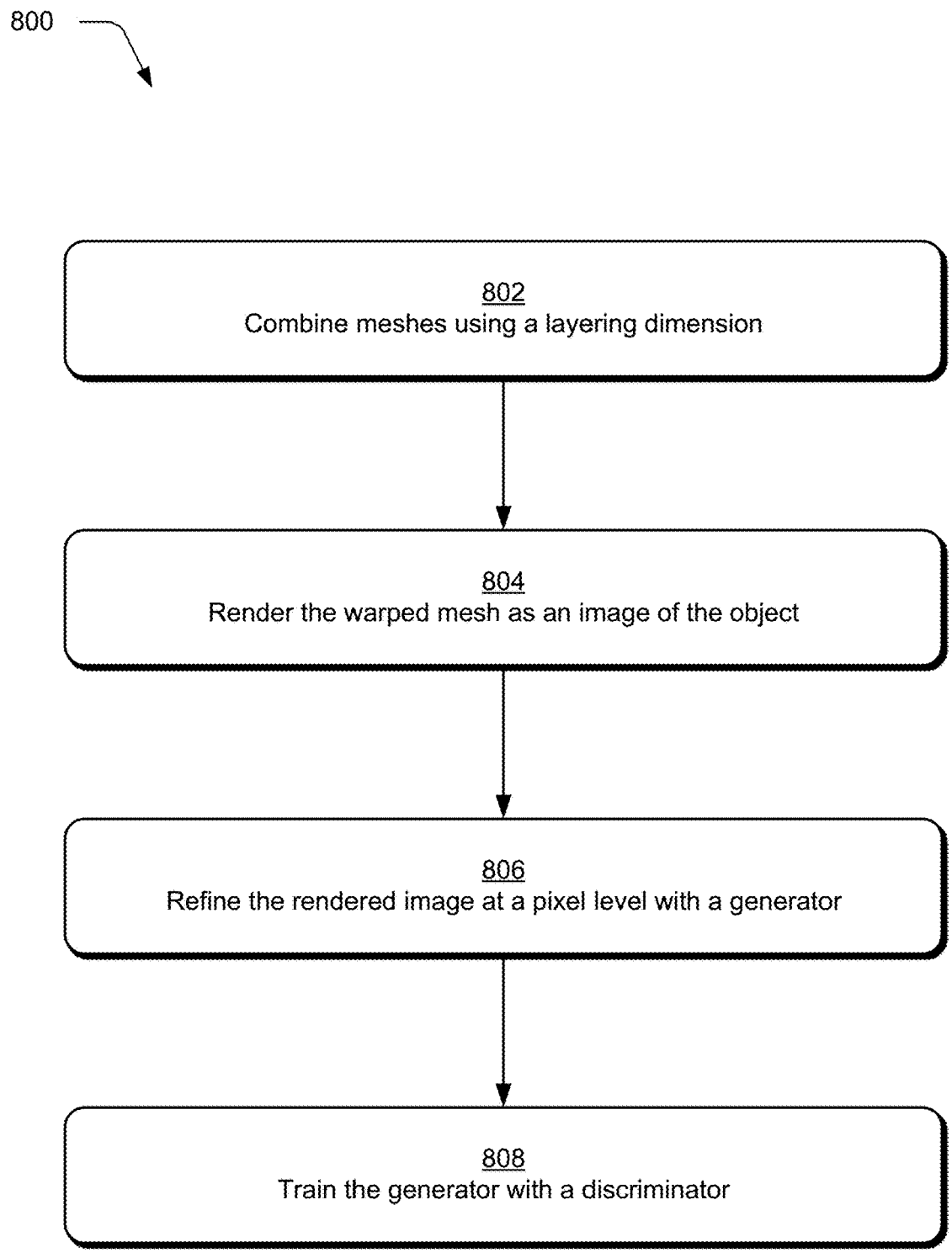
FIG. 8 is a flow diagram depicting a procedure in an example implementation in which a generator is trained by a discriminator.

FIG. 8 is a flow diagram depicting a procedure 800 in an example implementation in which a generator is trained by a discriminator. Meshes are combined using a layering dimension (block 802). For example, the layering module 602 can be implemented to combine the meshes using the layering dimension to distinguish relative depth of features of an object, and the rendering module 502 can be implemented to warp the combined meshes based on initial vertex positions of the combined meshes and predicted vertex offsets. The warped mesh is rendered as an image of the object (block 804). For example, the rendering module 708 may be implemented to render the image of the object. As described above, the rendered image can be compared to the object from the second frame, and based on the comparison a loss function 218 is used to train the neural network 122.

A generator of a generative adversarial network may receive the rendered image. The rendered image is then refined at a pixel level by the generator (block 806). This refined image is output by the generator and communicated to a discriminator of the generative adversarial network. Thus, the discriminator receives as inputs the refined image as well as a ground truth (e.g., the second frame 116), and the discriminator determines whether the refined image is real or fake 714. The generator is trained with the discriminator (block 808). The generator is trained by backpropagation of a result of the comparison, e.g., whether the refined image is considered real or fake 714.

Figure 9:
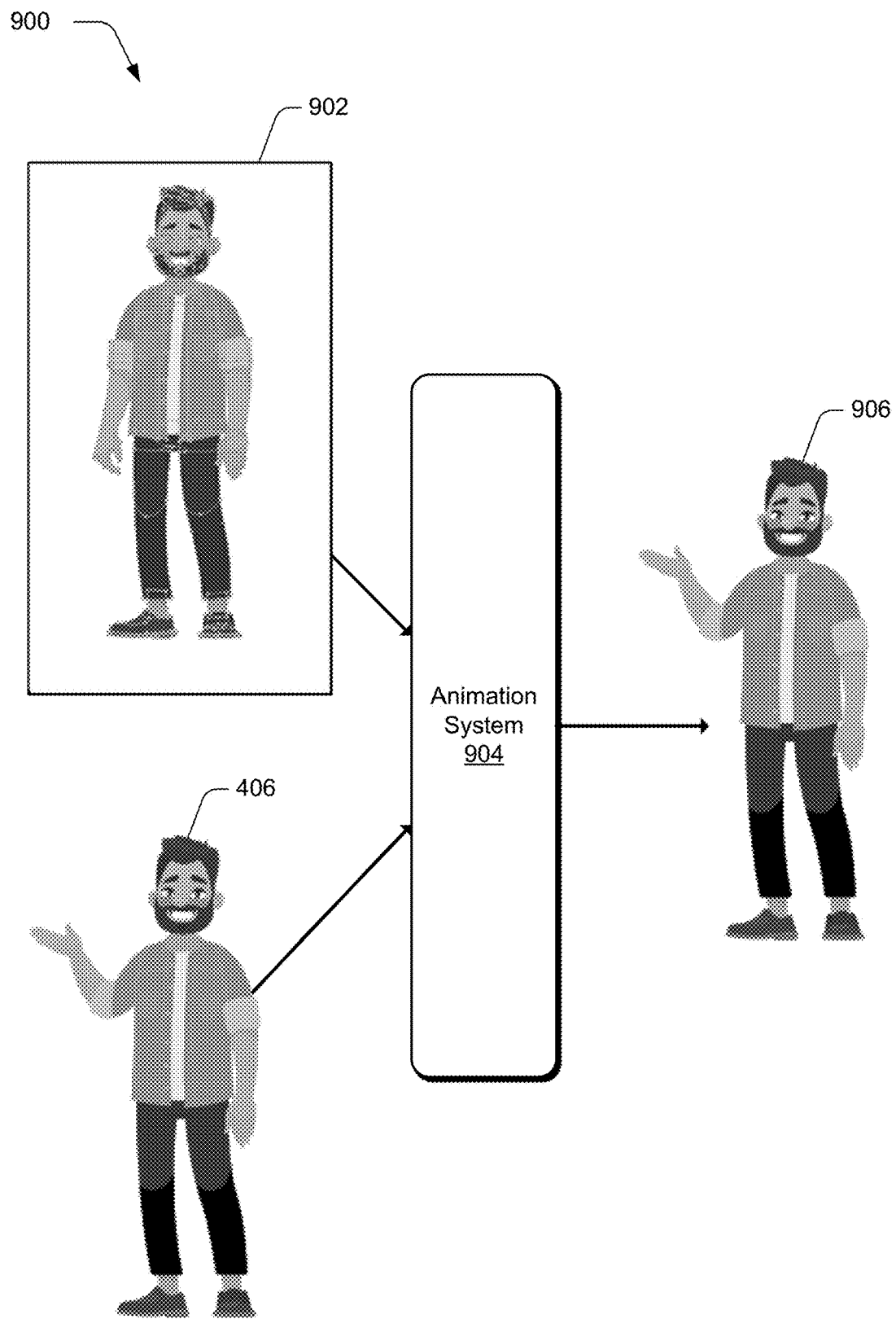
FIG. 9 is an illustration depicting a representation of object animation using generative neural networks.

FIG. 9 is an illustration depicting a representation 900 of object animation using generative neural networks. The representation 900 includes a combined mesh 902 of the object from the first frame 114 and the object 406 from the second frame 116 of the digital video. The combined mesh 902 and the object 406 are illustrated as inputs to an animation system 904 which outputs a refined image 906 of the object. The refined image 906 of the object is now almost indistinguishable from the object 406 from the second frame 116. Although described as reproduction of an object from a single frame of digital video, the same systems and techniques can be used to reproduce many frames of digital video. In this way, many reproduced frames may be combined and object animation is achieved using generative neural networks.

In one example, the animation system 904 may include an encoder and a decoder of a neural network to predict vertex offsets for warping the combined mesh 902 to match features of the object 406 from the second frame 116. In another example, the animation system 904 may include a Neural Renderer to receive faces, textures, initial vertex positions, and the predicted vertex offsets to warp the combined mesh 902 and render the warped mesh as an image of the object 406. For example, the neural network may be trained using a loss function based on a comparison of the rendered image of the object and the object 406. In an example, the animation system 904 may include a generator and a discriminator of a generative adversarial network. For example, the generator may generate a refined image from the rendered image and the discriminator may receive the refined image and a ground truth to determine whether the refined image is real or fake. In one or more implementations, the generator can be trained by backpropagation of a result of the discriminator's determination whether the refined image is considered real or fake. In this way, the animation system 904 may include a Neural Renderer to render the warped mesh as an image of the object 406 such that the image of the object is a reproduction of the object 406, and the animation system may include a generative adversarial network to refine the image of the object at a high frequency to correct the warping effects that make the rendered image of the object distinguishable from the object 406. In other words, the refined image can correct high frequency features of the rendered image which make it distinguishable from the object 406. Thus, the animation system 904 can transfer the motions of an object in a digital video to another object without needing any information about the definitions describing the motions of the object in the video.

As a result, the animation system 904 can improve digital animation by allowing digital animators to transfer an animation of an object to another object. This improvement also significantly increases the efficiency of digital animation because the animation can be transferred with minimum expert supervision or with no expert supervision. Thus, the animation system 904 can improve a user experience for digital animators by eliminating the tedious task of animating an object to have features of another animated object. Additionally, the animation system 904 may improve computational efficiency by using neural networks to transfer animation from an object to another object instead of requiring computations to render animation definitions for every object requiring animation.

Example System and Device

Figure 10:
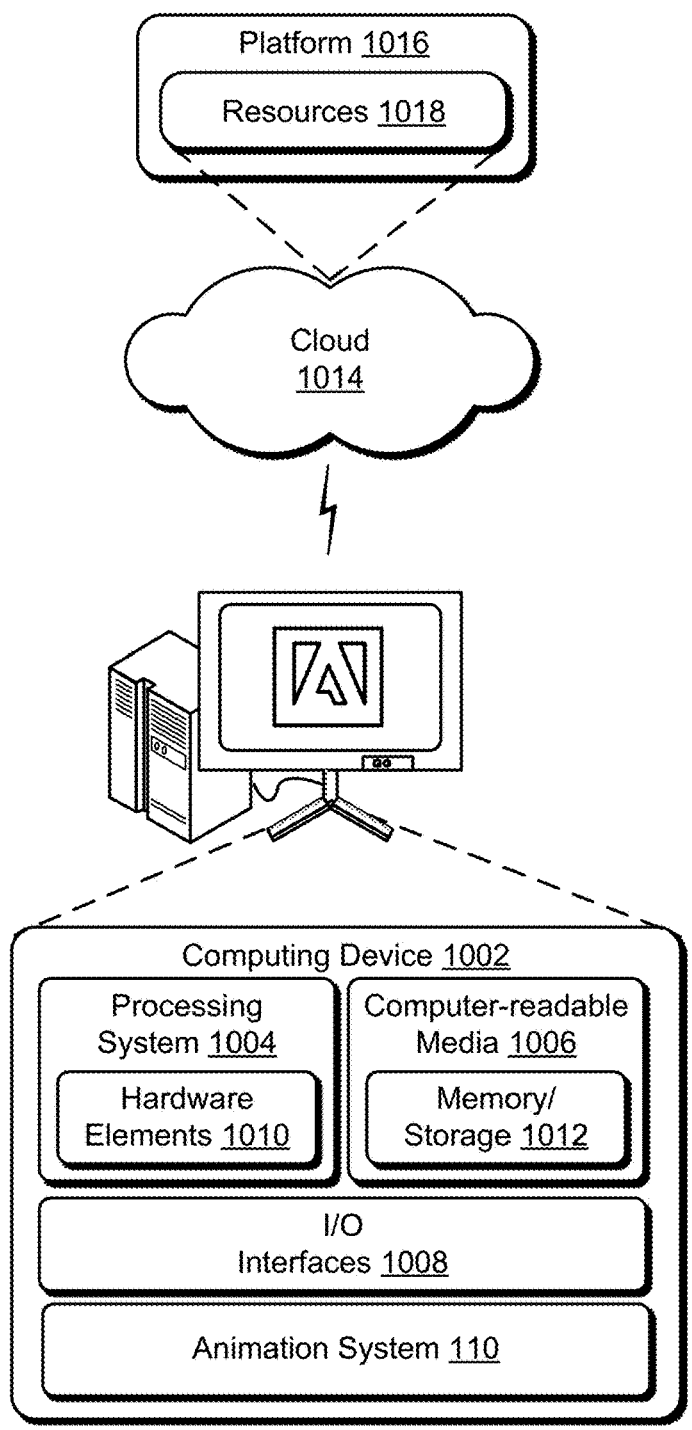
FIG. 10 illustrates an example system generally at that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the animation system 110. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources 1018 and functions to connect the computing device 1002 with other computing devices. The platform 1016 may also serve to abstract scaling of resources 1018 to provide a corresponding level of scale to encountered demand for the resources that are implemented via the platform 1016. Accordingly, in an interconnected device embodiment, implementation of functionality described herein may be distributed throughout the system 1000. For example, the functionality may be implemented in part on the computing device 1002 as well as via the platform that abstracts the functionality of the cloud 1014.

CONCLUSION

Although the implementation of object animation using generative neural networks has been described in language specific to structural features and/or methods, it is to be understood that the appended claims are not necessarily limited to the specific features or methods described. Rather, the specific features and methods are disclosed as example implementations of object animation using generative neural networks, and other equivalent features and methods are intended to be within the scope of the appended claims. Further, various different examples are described and it is to be appreciated that each described example can be implemented independently or in connection with one or more other described examples.

What is claimed is:

1. In a digital medium environment, a method implemented by a computing device, the method comprising:
    obtaining, by the computing device, a mesh from a first frame of a digital video, the mesh having a plurality of vertices corresponding to features of an object in the first frame, the mesh including a layering dimension that distinguishes between relative orientations of portions of the object in the first frame;
    identifying, by the computing device, features of the object in a second frame of the digital video using an encoder of a neural network;
    mapping, by the computing device, the identified features of the object from the second frame to the plurality of vertices of the mesh using the layering dimension and a decoder of the neural network;
    generating, by the computing device, at least one vertex offset of the plurality of vertices of the mesh based on the mapping;
    warping, by the computing device, the mesh based on the generated at least one vertex offset of the plurality of vertices of the mesh; and
    training, by the computing device, the neural network using a loss function based on a comparison of the warped mesh with the object as included in the second frame.

2. The method as described in claim 1, further comprising rendering the warped mesh as an image of the object for display in a user interface.

3. The method as described in claim 2, further comprising generating a refined image by refining the rendered image at a pixel level using a generative adversarial network.

4. The method as described in claim 3, further comprising training the generative adversarial network using another loss function based on a comparison of the object as included in the refined image with the object as included in the second frame.

5. The method as described in claim 3, wherein the generative adversarial network includes a generator for generating the refined image and a discriminator for training the generator based on a comparison of the object as included in the refined image with the object as included in the second frame.

6. The method as described in claim 1, wherein the layering dimension distinguishes between relative depths of the portions of the object in the first frame.

7. The method as described in claim 1, wherein the training of the neural network is unsupervised.

8. In a digital medium environment to reproduce animation from a digital video, a system comprising:
    a meshing module implemented at least partially in hardware of a computing device to obtain a mesh from a first frame of the digital video, the mesh having a plurality of vertices corresponding to features of an object in the first frame, the mesh including a layering dimension that distinguishes between relative orientations of portions of the object in the first frame;
    a selection module implemented at least partially in the hardware of the computing device to select a second frame from the digital video having the object;
    a mapping module implemented at least partially in the hardware of the computing device to map features of the object from the selected second frame to the plurality of vertices of the mesh using the layering dimension and a neural network;
    a prediction module implemented at least partially in the hardware of the computing device to generate at least one vertex offset of the plurality of vertices of the mesh based on the mapping;
    a warping module implemented at least partially in the hardware of the computing device to warp the mesh based on the at least one vertex offset of the plurality of vertices of the mesh; and
    a training module implemented at least partially in the hardware of the computing device to train the neural network using a loss function based on a comparison of the warped mesh with the object as included in the selected second frame.

9. The system as described in claim 8, wherein the warped mesh is rendered as an image of the object as part of the training the neural network.

10. The system as described in claim 9, wherein the training module includes a generative adversarial network configured to generate a refined image by refining the rendered image at a pixel level.

11. The system as described in claim 10, wherein the training module is implemented to train the generative adversarial network using another loss function based on a comparison of the object as included in the refined image with the object as included in the selected second frame.

12. The system as described in claim 10, wherein the generative adversarial network includes a generator for generating the refined image and a discriminator for training the generator based on a comparison of the object as included in the refined image with the object as included in the selected second frame.

13. The system as described in claim 8, wherein the layering dimension distinguishes between relative depths of the portions of the object in the first frame.

14. The system as described in claim 8, wherein the training module is implemented to train the neural network using unsupervised training.

15. In a digital medium environment to reproduce animation from a digital video, a system comprising:
- means for obtaining a mesh from a first frame of the digital video, the mesh having a plurality of vertices corresponding to features of an object in the first frame, the mesh including a layering dimension that distinguishes between relative orientations of portions of the object in the first frame;
- means for selecting a second frame from the digital video having the object;
- means for identifying features of the object in the second frame using an encoder of a neural network;
- means for generating at least one vertex offset of the plurality of vertices of the mesh using the layering dimension;
- means for warping the mesh based on the generated at least one vertex offset of the plurality of vertices of the mesh;
- means for training the neural network using a loss function based on a comparison of the warped mesh with the object as included in the second frame; and
- means for using the trained neural network to transfer a movement of the object from the digital video to another object.

16. The system as described in claim 15, further comprising means for rendering the warped mesh as an image of the object for display in a user interface.

17. The system as described in claim 16, further comprising means for generating a refined image by refining the rendered image at a pixel level using a generative adversarial network.

18. The system as described in claim 17, further comprising means for training the generative adversarial network using another loss function based on a comparison of the object as included in the refined image with the object as included in the selected second frame.

19. The system as described in claim 17, wherein the generative adversarial network includes a generator for generating the refined image and a discriminator for training the generator based on a comparison of the object as included in the refined image with the object as included in the selected second frame.

20. The system as described in claim 15, wherein the layering dimension distinguishes between relative depths of the portions of the object in the first frame.

* * * * *